(12) United States Patent
Li et al.

(10) Patent No.: US 10,053,860 B2
(45) Date of Patent: Aug. 21, 2018

(54) GYPSUM WALLBOARD WITH REINFORCING MESH

(71) Applicant: UNITED STATES GYPSUM COMPANY, Chicago, IL (US)

(72) Inventors: Alfred Li, Naperville, IL (US); Yijun Sang, Oak Park, IL (US); David Song, Vernon Hills, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 14/815,675

(22) Filed: Jul. 31, 2015

(65) Prior Publication Data

US 2017/0030076 A1 Feb. 2, 2017

(51) Int. Cl.
*E04C 2/04* (2006.01)
*B32B 37/12* (2006.01)
*B32B 37/20* (2006.01)
*B32B 5/02* (2006.01)
*B32B 13/08* (2006.01)
(Continued)

(52) U.S. Cl.
CPC .............. *E04C 2/043* (2013.01); *B32B 3/266* (2013.01); *B32B 5/02* (2013.01); *B32B 13/02* (2013.01); *B32B 13/08* (2013.01); *B32B 13/14* (2013.01); *B32B 29/02* (2013.01); *B32B 37/12* (2013.01); *B32B 37/20* (2013.01); *B32B 2037/1276* (2013.01); *B32B 2250/05* (2013.01); *B32B 2250/40* (2013.01); *B32B 2260/021* (2013.01); *B32B 2260/044* (2013.01); *B32B 2305/08* (2013.01); *B32B 2305/38* (2013.01); *B32B 2307/50* (2013.01); *B32B 2317/12* (2013.01);
(Continued)

(58) Field of Classification Search
CPC ........... B32B 37/20; B32B 5/02; B32B 13/08; B32B 37/12; B32B 2305/38; B32B 2037/1276; B32B 2317/12; B32B 2260/044; B32B 2250/05; B32B 2250/40; B32B 2305/08; B32B 2607/00; E04C 2/043; E04B 2303/02
See application file for complete search history.

(56) References Cited

U.S. PATENT DOCUMENTS 1,439,954 A 12/1922 Emerson
1,500,452 A 7/1924 Haggerty
(Continued)

OTHER PUBLICATIONS

International Search Report from International Patent Application No. PCT/US2016/044049, dated Oct. 4, 2016.

*Primary Examiner* — Brian Handville
(74) *Attorney, Agent, or Firm* — Greer, Burns & Crain, Ltd.; Pradip Sahu; Philip T. Petti

(57) ABSTRACT

A wallboard panel is provided, including a sheet of face paper, a first layer of gypsum composition having a first density, a web of mesh associated with the first layer of gypsum composition, a second layer of gypsum composition having a second density, the second density being lower than the first density, and a layer of backing paper. An associated method includes providing a sheet of face paper and laying same upon a moving conveyor belt, applying a first layer of gypsum composition slurry upon the sheet of face paper, applying a web of mesh upon the first layer of gypsum composition slurry, applying a second layer of gypsum composition slurry upon the web of mesh, and applying a sheet of backing paper upon the second layer of gypsum composition slurry.

13 Claims, 4 Drawing Sheets

(51) Int. Cl.
  *B32B 13/02* (2006.01)
  *B32B 13/14* (2006.01)
  *B32B 29/02* (2006.01)
  *B32B 3/26* (2006.01)

(52) U.S. Cl.
  CPC ....... *B32B 2607/00* (2013.01); *E04B 2103/02* (2013.01)

(56) References Cited

U.S. PATENT DOCUMENTS

| | | |
|---|---|---|
| 2,207,339 A | 7/1940 | Camp |
| 3,284,980 A | 11/1966 | Dinkel |
| 3,289,371 A | 12/1966 | Pearson et al. |
| 4,009,062 A | 2/1977 | Long |
| 4,203,788 A | 5/1980 | Clear |
| 4,327,146 A | 4/1982 | White |
| 4,810,569 A | 3/1989 | Lehnert et al. |
| 5,922,447 A | 7/1999 | Baig |
| 5,961,900 A | 10/1999 | Wedi |
| 6,190,476 B1 | 2/2001 | Seecharan et al. |
| 6,221,521 B1 | 4/2001 | Lynn et al. |
| 6,391,131 B1 | 5/2002 | Newman et al. |
| 6,475,313 B1 | 11/2002 | Peterson et al. |
| 6,800,361 B2 | 10/2004 | Bruce et al. |
| 7,470,338 B2 | 12/2008 | Callais et al. |
| 7,691,467 B2 | 4/2010 | Kimura et al. |
| 8,142,914 B2 | 3/2012 | Yu et al. |
| RE44,070 E | 3/2013 | Yu et al. |
| 8,461,067 B2 | 6/2013 | Smith et al. |
| 8,470,461 B2 | 6/2013 | Yu et al. |
| 8,566,041 B2 | 10/2013 | Li |
| 8,993,462 B2 | 3/2015 | Duselis et al. |
| 2002/0090871 A1* | 7/2002 | Ritchie ............... E04C 2/043 442/42 |
| 2005/0067082 A1* | 3/2005 | Mowry ............... C04B 28/145 156/39 |
| 2005/0238863 A1* | 10/2005 | Swales ............... B28B 23/0006 428/292.1 |
| 2007/0059513 A1 | 3/2007 | Yu et al. |
| 2007/0122604 A1 | 5/2007 | Wang et al. |
| 2007/0267120 A1* | 11/2007 | Feigin ............... B32B 13/14 156/45 |
| 2010/0048080 A1* | 2/2010 | Bland ............... E04C 2/043 442/386 |
| 2010/0055431 A1 | 3/2010 | College |
| 2012/0207989 A1 | 8/2012 | Xu et al. |
| 2013/0196061 A1 | 8/2013 | Hull |
| 2016/0375655 A1 | 12/2016 | Li et al. |

\* cited by examiner

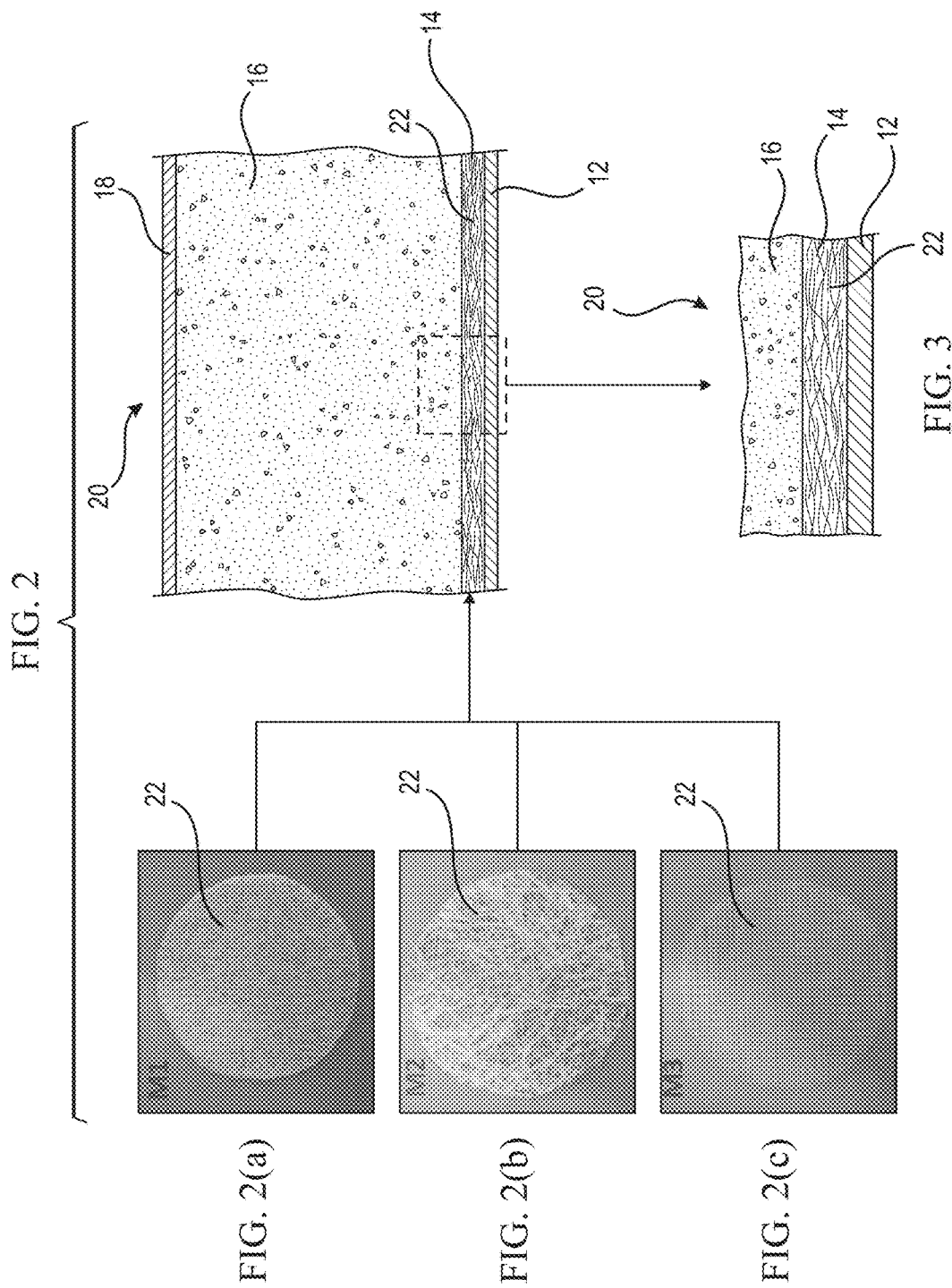

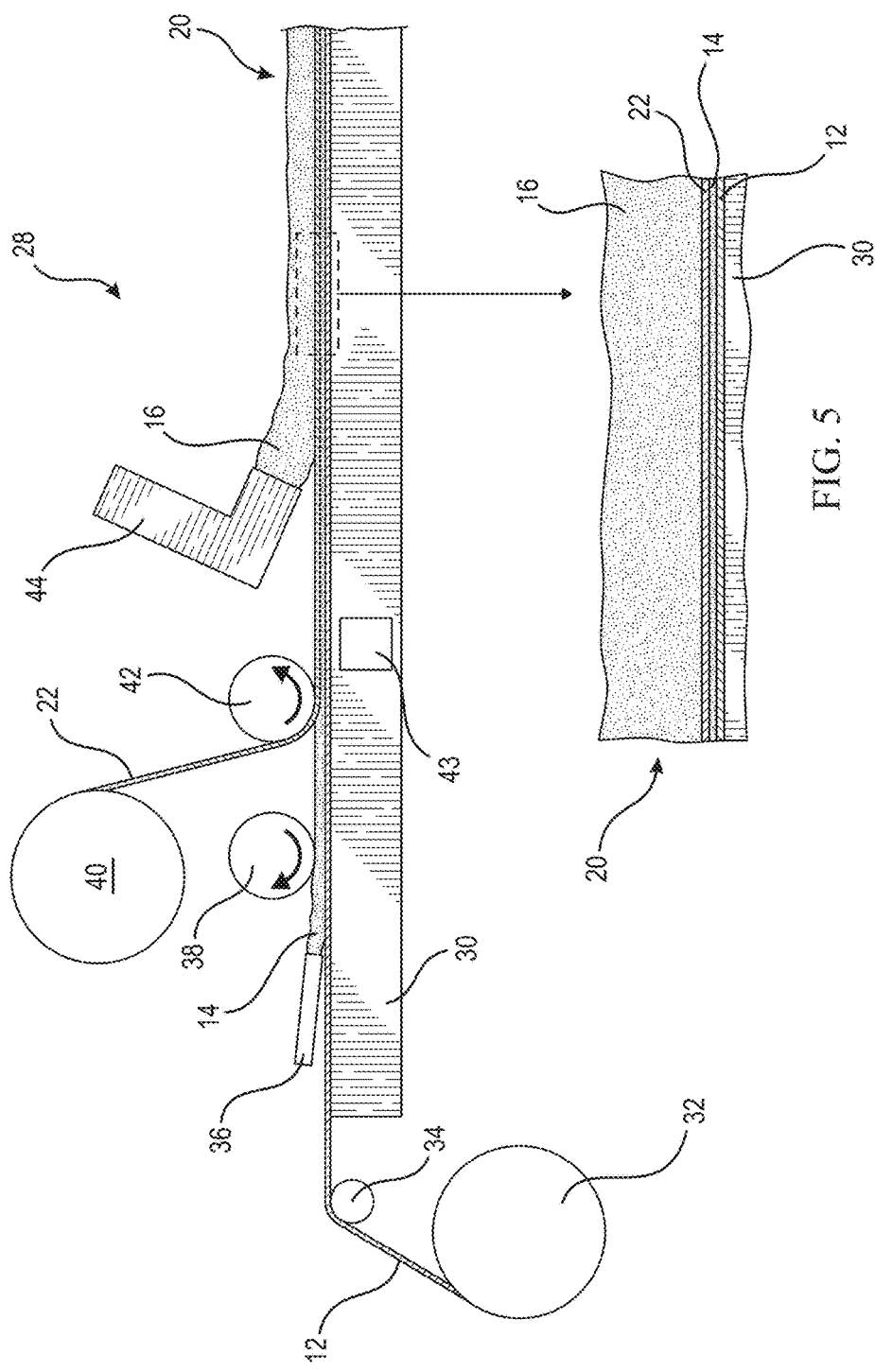

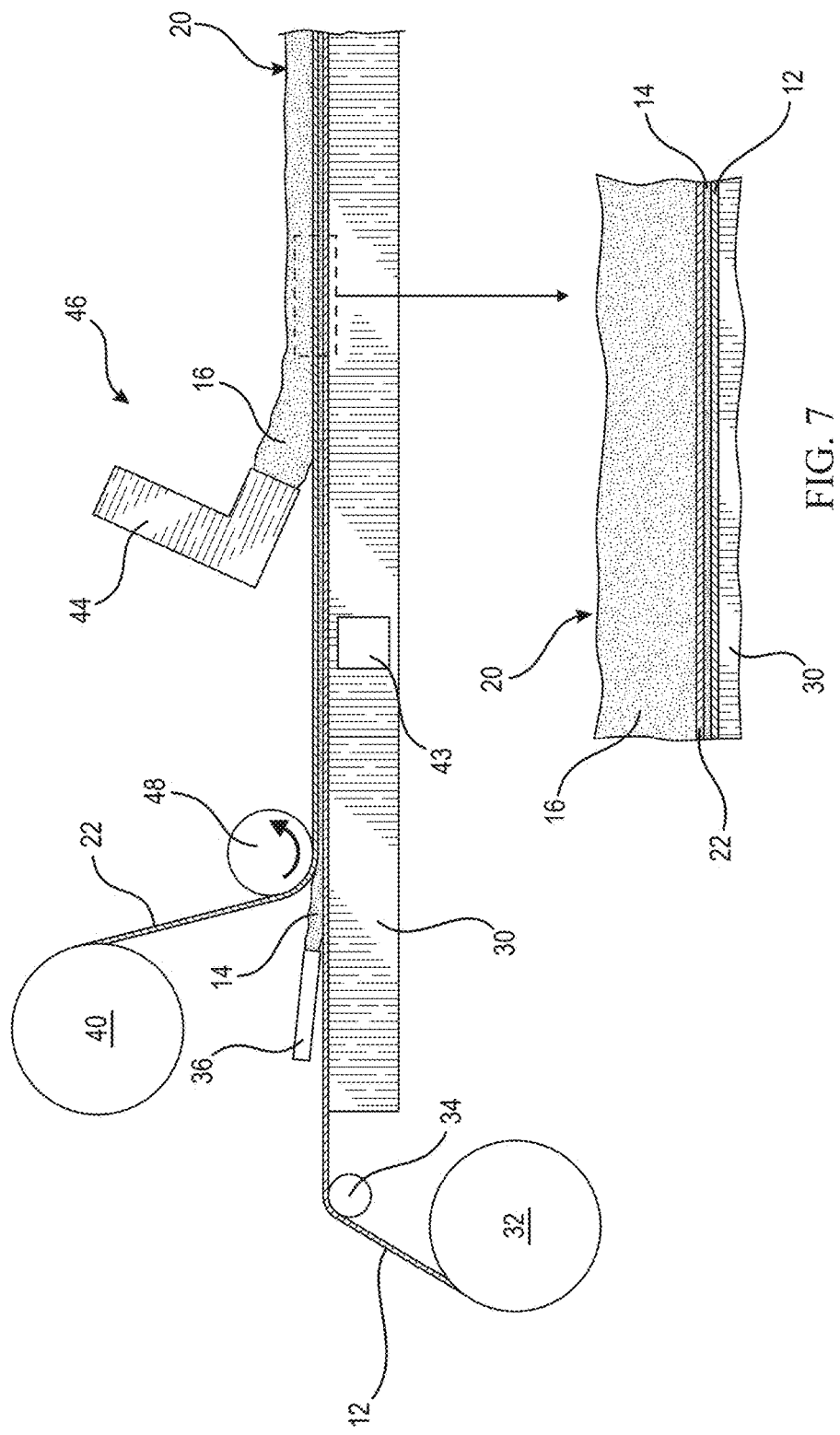

GYPSUM WALLBOARD WITH REINFORCING MESH

BACKGROUND

The present invention relates generally to the production of wallboard building panels, and more specifically to an improved gypsum wallboard panel that features a layer of supporting mesh for improving production of the panels, and also for providing increased nail pull resistance.

Gypsum building panels offer a high performance product for a reasonable price for finishing of building spaces. Gypsum, also known as calcium sulfate dihydrate, is heated to drive off crystalline water to produce calcium sulfate anhydrite and/or calcium sulfate hemihydrate, also known as stucco, calcined gypsum or Plaster of Paris. The building panels are made by creating a slurry, combining dry stucco with water. Calcined gypsum and water are combined and an interlocking matrix of gypsum crystals is formed. After the hydration of the calcined gypsum, excess water is driven off by heating, the resulting product is a relatively strong panel, having a good surface for receiving decorative finishes such as paint or wallpaper.

One method of controlling the density of the product is by the addition of a soap-based foam to the liquid slurry. The stucco then sets around the foam bubbles, creating voids in the gypsum matrix. It is important to control the size of the bubbles to avoid undesirable properties in the panels. If the bubbles are too small, a large number of small bubbles are needed to effect the change in density. Where there are lots of bubbles in a confined space, the resulting gypsum matrix has a low compressive strength. Bubbles that are too large cause a decrease in strength and form unsightly blisters under the facing paper.

It is well known to fabricate wallboard or drywall building panels using a sheet of face paper, a slurry of gypsum, and a sheet of backing paper. These components are assembled sequentially on a moving conveyor belt. Reduction in the amount of water needed to produce gypsum is also desirable. Water in excess of that needed to hydrate the calcined gypsum is removed by kiln drying. Fuel costs to operate the drying kiln make it advantageous to reduce the amount of water in a gypsum slurry, while maintaining similar flow characteristics.

Many conventional techniques for reducing the percentage of water in the slurry have produced wallboard with reduced strength, measured as Nail Pull Resistance. In other words, the resulting panel is less resistant to being pulled back over the head of a nail driven into a supporting stud, and as such is less securely retained to the underlying building frame. U.S. Pat. No. 8,566,041, incorporated by reference, discloses a system for calculating Nail Pull Resistance.

Further, it is known to produce wallboard panels with multi-layer gypsum construction, including a first gypsum layer located adjacent the face paper and having a first density, and a second gypsum layer applied upon the first layer. The second layer has a second density, and the density of the second layer is lower than that of the first layer. The higher density of the first layer, achieved by the injection of less foam or water as discussed above, has been found to bond more securely to the face paper. An alternative technique is to differentiate the first and second layers by the addition of different amounts of starch to the slurry, with the first layer receiving more starch than the second layer, to increase strength. During the production of such wallboard panels, it is not uncommon for the flowing of the second layer upon the first layer on the moving production line to cause at least a partial "washout" of the first layer, due to the relatively high velocity of the output of the second layer from the mixer, compared to the conveyor belt line speed. In one example, the output velocity of the slurry forming the second layer is one and a half to three times the speed of the conveyor line. This "washout" disrupts, misaligns or otherwise interferes with the proper positioning and formation of the first layer, which ultimately results in substandard panels.

Accordingly, there is a need for an improved wallboard production system resulting in reduced "washout" and ultimate wallboard panels having increased Nail Pull Resistance.

SUMMARY

The above-listed needs are met or exceeded by the present wallboard panel which features a face paper covering, a first layer of relatively high density gypsum formulation; a web of supporting mesh in the first layer, preferably near the face paper, a second layer of relatively lower density gypsum formulation, and a sheet of backing paper. It has been found that the mesh supports and protects the first layer of gypsum slurry, having the higher density, from the effects of the impact of relatively high velocity slurry used to form the second, relatively lower density layer of gypsum. In a preferred embodiment, the mesh is in contact with the face paper, and also provides enhanced Nail Pull Resistance.

In the present application, "mesh" refers to any perforated, breathable substrate that is provided in web or mat format and is constructed and arranged to be installed as a web or sheet upon a gypsum production line from a roll of such material. Suitable mesh includes but is not limited to nonwoven or woven fiber mats of polymers or other materials, perforated film, screening material, or the like. Preferably, the mesh has a thickness in the range of 0.015 inch, similar to the thickness of a sheet of heavy paper.

In a preferred embodiment, the first layer has a relatively higher concentration of starch than the second layer. Also, the mesh is either laid upon the first layer during board production, or is pressed or embedded into the first layer prior to application of the second layer. It is preferred that the mesh be disposed in the first layer in relatively close proximity to, or in contact with, the face paper for achieving desired increased Nail Pull Resistance. In another preferred embodiment, the second layer of gypsum formulation also penetrates the mesh.

More specifically, the present invention provides a wallboard panel, including a sheet of face paper, a first layer of gypsum composition having a first density, a web of mesh associated with the first layer of gypsum composition, a second layer of gypsum composition having a second density, the second density being lower than the first density, and a layer of backing paper.

In another embodiment, a method of producing wallboard panels, is provided, including providing a sheet of face paper and laying same upon a moving conveyor belt, applying a first layer of gypsum composition slurry upon the sheet of face paper, applying a web of mesh upon the first layer of gypsum composition slurry, applying a second layer of gypsum composition slurry upon the web of mesh, and applying a sheet of backing paper upon the second layer of gypsum composition slurry.

BRIEF DESCRIPTION OF THE DRAWINGS

FIG. 2 is a schematic fragmentary vertical cross-section of the present wallboard panel, including enlarged micrographs of suitable mesh materials;

FIGS. 2a-c are enlarged photomicrographs of suitable mesh materials;

FIG. 3 is a schematic fragmentary enlarged vertical cross-section of a lower portion of the panel of FIG. 2;

FIG. 4 is a fragmentary schematic side elevation of a wallboard production line suitable for making the present wallboard panels;

FIG. 5 is an enlarged fragmentary elevation of FIG. 4;

FIG. 6 is a fragmentary schematic side elevation of an alternate embodiment of the wallboard production line of FIG. 4; and FIG. 7 is a fragmentary enlargement of FIG. 6.

DETAILED DESCRIPTION

Figure 1:
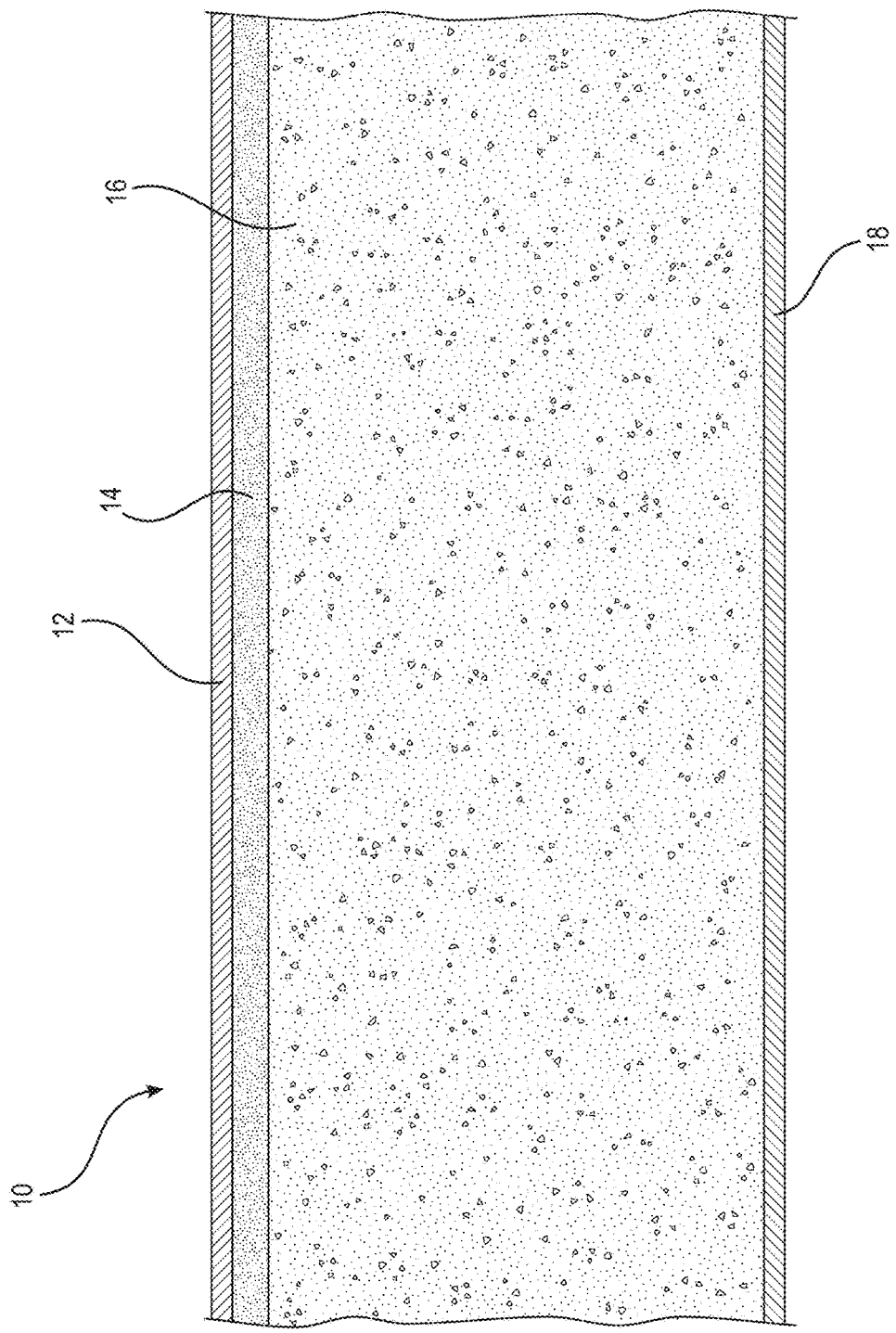
FIG. 1 is a schematic fragmentary vertical cross-section of a prior art composite wallboard panel.

Referring now to FIG. 1, a prior art so-called "composite" gypsum wallboard panel is generally designated 10, and includes a sheet of face paper 12, a top core of relatively dense gypsum formulation 14, a bottom core of relatively less dense gypsum formulation 16, and a sheet of backing paper, also referred to as craft paper 18. As is known in the art, and as described in greater detail below, the panel 10 is produced with the face paper sheet 12 contacting a moving belt of the conveyor line, and as such the panel is constructed "face paper down" or inverted from the orientation shown in FIG. 1. The face paper sheet 12 has a preferred thickness in the range of 0.012 to 0.015 inch, and most preferably 0.013 inch.

As is known with such composite panels 10, both the top core layer 14 and the bottom core layer 16 are compositions of calcium sulfate hemihydrate, water, a foaming agent and stabilizers as are well known in the art. Suitable gypsum wallboard compositions are described in commonly owned U.S. Pat. Nos. 1,500,452; 2,207,339; 4,009,062; 5,922,447; 8,470,461; and 8,142,914, all of which are incorporated by reference.

Referring now to Table 1. below, in the panel 10, the top core layer 14 is made from a relatively high density calcium sulfate hemihydrate slurry with a density in the general range of 26-40 pcf and a thickness in the general range of 0.015-0.035 inch prior to setting or "wet", which becomes thinner upon setting or drying, to be in the range of 0.005-0.010 inch. In one embodiment, the top core layer 14 has a thickness of 0.008 inch. The bottom core layer 16 is made from a relatively low density calcium sulfate hemihydrate slurry with a density in the general range of 22-30-pcf and a thickness in the general range of 0.432 to 0.422 inch. In other words, the bottom core layer 16 has a density ranging from 60% to 92% of the density of the relatively denser top core layer 14. Also, the thickness of the top core layer 14 relative to the bottom core layer 16 ranges generally from 9% to 12%.

TABLE 1

Properties of dual core wallboard panel

| ½" Light Weight Product | Density (pcf) | Thickness (in) | PregelStarch (% of stucco) |
| --- | --- | --- | --- |
| Face Material | 38-43 | 0.015 | N/A |
| Top Layer | 26-40 | 0.015 to 0.035 | 10-20 |
| Bottom Layer | 22-30 | 0.432-0.422 | 2-4 |
| Back Paper | 38-43 | 0.013 | N/A |

The greater density in the top core layer 14 is usually achieved through application of water and/or foam, as is well known in the art. However, another technique is to add greater percentages of starch, strength additives, water resistance additives, fire resistance materials, among others to the top core layer 14 to increase its strength and other preferred properties. Preferably, the starch is found in the approximate range of 10 to 20% weight percent of the stucco weight used to make the top core layer 14, compared to approximately 2 to 4% weight percent starch of stucco weight in the bottom core layer 16.

During production of the panel 10, after the face paper sheet 12 is laid upon the production line conveyor belt, the relatively denser gypsum slurry forming the top core layer 14 is poured upon the face paper. Next, the relatively less dense gypsum slurry forming the bottom core layer 16 is poured upon the top core layer 14. As described above, it has been found that, during production, the application of the bottom core layer 16 causes unwanted "washout" of the top core layer 14 because the former is applied at a much greater velocity (at least as much as three times greater) than the speed of the board conveyor.

Referring now to FIGS. 2 and 3, the present wallboard panel is generally designated 20. Components shared with the panel 10 are designated with identical reference numbers. Also, the layers 14, 16 are basically the same in composition and relative density in both the panel 10 and the panel 20. In FIG. 2, the panel 10 is shown inverted, with the face paper sheet 12 at the bottom, which is the orientation of the panel as it emerges from the production line. A main distinctive feature of the panel 20 is the inclusion of a web of mesh 22 in close proximity to the first layer, or the top core 14. As seen in FIGS. 2 and 3, the mesh web 22 preferably contacts the face paper 12.

Referring now to FIGS. 2 a-c, as described above, the web of mesh 22 refers to any perforated, breathable substrate that is provided in web or mat format and is constructed and arranged to be installed as a web or sheet upon a gypsum production line from a roll of such material. Suitable mesh includes but is not limited to fine mesh nonwoven fiber mats, such that the randomly distributed openings between the randomly distributed fibers are significantly smaller than the shank diameter of a typical wallboard nail (at least 0.098 inch)(FIG. 2a); relatively coarser mesh nonwoven fiber mats with randomly distributed openings in the range of 0.078 to 0.236 inch. diameter (FIG. 2b); screen cloth or structured fibers with openings of approximately 0.078 inch. (FIG. 2c); as well as -woven fiber mats of polymers or other materials, perforated film, screening material, or the like. A preferred thickness of the mesh web is in the range of 0.010-0.030 inch, and a further preferred thickness is in the range of 0.015-0.020 inch, or approximately the same thickness as a sheet of paper.

It has been found that by associating the mesh web 22 with the top core material 14, the unwanted washout is prevented during board production as the lower density core or bottom layer 16 is applied. Instead, the distribution of the initially applied top core layer 14 is more evenly distributed in the resulting panel as a result of the action of the mesh web 22. An added benefit of the present mesh web 22 is that the Nail Pull Resistance of the resulting panel is significantly improved. In board production, increasing density of the top core 14 alone has not been found to improve Nail Pull Resistance. Instead, such higher density layers are in some cases more prone to cracking. Still another advantage of the present mesh web 22 is that it has been found to enhance crystal development as the gypsum sets in the mesh.

Referring now to FIGS. 4 and 5, a wallboard panel production apparatus is schematically illustrated and generally designated 28 for disclosing a preferred method for producing the wallboard panels 20. First, as is typical in wallboard manufacturing, a conveyor table 30 supports a moving conveyor belt (not shown) upon which is laid the face paper 12, with the outer surface facing the belt, as is well known in the art. The face paper 12 is supplied from a roll 32, and is maintained at a proper tension through the use of at least one idler roller 34.

Next, the relatively denser, and relatively thinner top core composition 14 is applied in slurry form through a designated mixer outlet 36 upon the face paper 12. A rotating forming roller 38 is disposed at a desired height relative to the conveyor table 30 for forming and leveling the top core 14. The web of mesh 22 is applied upon the top core 14 and is supplied from a roll 40. A rotating press roller 42 maintains tension on the mesh web 22, and also presses the mesh web into the top core 14, which has not yet set. It is preferred that the mesh web 22 be embedded into the top core 14 so that the mesh is closer to the face paper 12 than to the backing paper 18, a variety of mesh positions within the top core are contemplated. It is further preferred that the mesh 22 is in contact with the face paper 12.

After the mesh web 22 is embedded into the top core 14, the relatively lower density, and relatively thicker bottom core 16 is applied upon the mesh web 22 in slurry format through a mixer outlet 44. As is known in the art, the mixer outlet emits the slurry of the bottom core 16 at a velocity that is in some cases as much as three times the speed of the board line, having a speed in the range of 100-680 ft/min. This relatively higher velocity has been known to cause the unwanted "washout" of the top core 14 as described above. However, the application of the mesh web 22 has been found to prevent washout, and maintain the desired form of the top core 14. Another contemplated embodiment is to have the bottom layer slurry 16 penetrating the mesh web 22 on the moving conveyor belt with the aid of table vibration provided by a conventional conveyor vibrator, represented by 43. After application of the bottom core slurry 16, the backing paper 18 is applied from a supply roll (not shown) as is well known in the art. Subsequently, the panel is allowed to set, is trimmed and passed to a drying kiln as is well known in the art.

Referring now to FIGS. 6 and 7, an alternate apparatus generally designated 46 is provided for forming the present panel 20. Components shared with the apparatus 28 of FIGS. 4 and 5 are designated with identical reference numbers. The main distinguishing feature of the apparatus 46 is that a rotating embedding roller 48 forms the top core slurry 14, maintains tension on the mesh web 22 and also embeds it into the top core. All of the other features of the apparatus 46 correspond to the apparatus 28.

Referring now to Table 2 below, besides the advantage of preventing unwanted washout, it has been found that by adding the mesh web 22 to the top core layer 14, the Average Nail Pull Resistance is increased. The Average Nail Pull Resistance in ($lb_f$) ranges from 71.3 to 104.9 $lb_f$. The highest Nail Pull Resistance values were obtained using the relatively fine mesh non-woven web as seen in FIG. 2(a). Also, it will be seen for each lab sample ID, having the same density, adding the mesh web 22 enhanced the Nail Pull values significantly. Also, the greatest improvement in Nail Pull Resistance, approximately 20% improvement, was achieved using the fine mesh non-woven web of FIG. 2(a). In Table 2, in the Dispersant column, PCE refers to Polycarboxylate Ether, and PNS refers to Napthalene Sulfonate.

TABLE 2

| Nail Pull Data with and without porous mesh web | | | | |
|---|---|---|---|---|
| Lab ID | Dispersant | Porous Mat | Density (pcf) | Ave Nail Pull ($lb_f$) |
| 140808-1A | PCE | | 29.0 | 82.2 |
| 140808-1B | | M1 | | 91.5 |
| 140808-2A | PCE | | 26.7 | 71.3 |
| 140808-2B | | M2 | | 83.1 |
| 140808-3A | PCE | | 26.1 | 75.1 |
| 140808-3B | | M3 | | 79.6 |
| 140808-4A | PNS | | 28.6 | 87.0 |
| 140808-4B | | M1 | | 104.9 |
| 140808-5A | PNS | | 29.0 | 79.9 |
| 140808-5B | | M1 | | 92.9 |

Thus, it has been shown that by providing the mesh web 22 in the top core layer 14, not only has unwanted washout been prevented, but Nail Pull Resistance is improved.

While a particular embodiment of the gypsum wallboard with reinforcing mesh has been described herein, it will be appreciated by those skilled in the art that changes and modifications may be made thereto without departing from the invention in its broader aspects and as set forth in the following claims.

The invention claimed is:

1. A wallboard panel, comprising:
   a sheet of face paper having a thickness in the range of 0.012 to 0.015 inch;
   a first layer of gypsum composition having a first density and being in contact with
   said sheet of face paper;
   a web of mesh being located only on a side of the wallboard panel being associated with said first layer of gypsum and being in direct contact with said sheet of face paper, said web of mesh embedded into said first layer of gypsum composition;
   a second layer of gypsum composition having a second density, said second density being lower than said first density, said first layer of gypsum composition has an approximate 10-20% weight percentage of starch, and said second layer of gypsum composition has an approximate 2-4% weight percentage of starch; and
   a layer of backing paper.

2. The panel of claim 1, wherein said web of mesh is disposed in said first layer of gypsum to be closer to said sheet of face paper than to said backing paper.

3. The panel of claim 1, wherein said first layer of gypsum composition has a first thickness and said second layer of gypsum composition has a second thickness, wherein said second thickness is greater than said first thickness.

4. The panel of claim 1, wherein said first layer of gypsum composition has a density in the range of 26-40 pcf, and said second layer of gypsum composition has a density in the range of 22-30 pcf.

5. The panel of claim 1, wherein said mesh is taken from the group consisting of nonwoven or woven fiber mats of polymers or other materials, perforated film, and screening material.

6. The panel of claim 1, wherein said mesh is embedded into said first layer of gypsum composition.

7. The panel of claim 1, wherein said mesh has an approximate thickness of 0.015 inch -0.020 inch.

8. The panel of claim 1, wherein said panel at said first layer incorporates polycarboxylate ether as a dispersant and has an average Nail Pull of at least 79.6 $lb_f$.

9. The panel of claim 1, wherein said second layer of gypsum composition penetrates said mesh.

10. A wallboard panel, comprising:
a sheet of face paper having a first thickness in the range of 0.012 to 0.015 inch;
a first layer of gypsum composition having a first density of 26 to 40 pcf, incorporating polycarboxylate ether as a dispersant and being in contact with said sheet of face paper;
a web of mesh located only on a side of the wallboard being associated with said first layer of gypsum and being in direct contact with said sheet of face paper, said web of mesh having a thickness between 0.010 to 0.030 inch and said first layer of gypsum having a thickness between 0.015 to 0.035 inch prior to setting and between 0.005 to 0.010 inches when set and part of said wallboard panel;
a second layer of gypsum composition having a second density and a second thickness, said second density being lower than said first density and said second thickness being thicker than said thickness of said first layer of gypsum after setting, said first layer of gypsum composition has an approximate 10-20% weight percentage of pregel starch, and said second layer of gypsum composition has an approximate 2-4% weight percentage of pregel starch, said second layer penetrating said mesh; and
a layer of backing paper.

11. The panel of claim 10, wherein said panel at said first layer has an average Nail Pull of at least 79.6 $lb_f$.

12. The panel of claim 1, wherein said mesh has a thickness between 0.010 to 0.030 inch and said first layer of gypsum has a thickness between 0.015 to 0.035 inch prior to setting and between 0.005 to 0.010 inches when set and part of said wallboard panel.

13. A wallboard panel, comprising:
a sheet of face paper having a first thickness in the range of 0.012 to 0.015 inch;
a first layer of gypsum composition having a first density of 26 to 40 pcf and being in contact with said sheet of face paper;
a web of mesh located only on a side of said wallboard panel being associated with said first layer of gypsum and being in direct contact with said sheet of face paper, said web of mesh having a thickness between 0.010 to 0.030 inch and said first layer of gypsum having a thickness between 0.015 to 0.035 inch prior to setting and between 0.005 to 0.010 inches when set and part of wallboard panel;
a second layer of gypsum composition having a second density and a second thickness, said second density being 22 to 30 pcf and said second thickness being thicker than said thickness of said first layer of gypsum after setting, said first layer of gypsum composition has an approximate 10-20% weight percentage of pregel starch, and said second layer of gypsum composition has an approximate 2-4% weight percentage of pregel starch, said second layer penetrating said mesh; and
a layer of backing paper,
wherein said panel at said first layer has an average Nail Pull of at least 79.6 $lb_f$.

\* \* \* \* \*